(12) United States Patent
Shelton et al.

(10) Patent No.: US 6,338,028 B1
(45) Date of Patent: Jan. 8, 2002

(54) ULTRASONIC SENSOR SYSTEM AND METHOD HAVING INPUT CAPTURE FOR ECHO PROCESSING

(75) Inventors: Dennis James Shelton, Southfield; Stephen R. W. Cooper, Fowlerville, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/096,115

(22) Filed: Jun. 11, 1998

(51) Int. Cl.$^7$ ................................................ B60Q 1/00
(52) U.S. Cl. .................. 702/159; 702/39; 702/143; 702/148
(58) Field of Search ............................ 73/12, 597, 623, 73/625, 626, 631, 67.9; 128/660; 180/274, 282; 280/734, 735; 310/315; 318/286; 324/452; 364/565, 562, 505, 506, 550, 571.03; 367/6, 13, 82, 97, 98, 99, 108, 911, 115, 910, 116, 902, 127, 900, 128, 140; 701/45, 46; 702/39, 143, 148, 159, 171

(56) References Cited

U.S. PATENT DOCUMENTS

| | | | |
|---|---|---|---|
| 3,745,520 A | | 7/1973 | Barret et al. |
| 3,791,199 A | * | 2/1974 | Touh et al. ................... 73/67.9 |
| 3,985,030 A | | 10/1976 | Charlton |
| 4,000,650 A | | 1/1977 | Snyder |
| 4,112,746 A | * | 9/1978 | Itoh et al. ....................... 73/95 |
| 4,114,441 A | | 9/1978 | Magri |
| 4,166,394 A | | 9/1979 | Figura |
| 4,169,255 A | | 9/1979 | Hulsman et al. |
| 4,221,004 A | | 9/1980 | Combs et al. |
| 4,229,796 A | * | 10/1980 | Garrett ........................ 364/507 |
| 4,247,922 A | * | 1/1981 | Jackson et al. ................. 367/6 |
| 4,299,114 A | | 11/1981 | Silvermetz et al. |
| 4,320,659 A | | 3/1982 | Lynnworth et al. |
| 4,420,814 A | * | 12/1983 | Arikawa et al. ............. 364/565 |
| 4,438,402 A | * | 3/1984 | Cullen et al. ................ 324/452 |
| 4,476,873 A | * | 10/1984 | Sorenson et al. ........... 128/660 |
| 4,564,018 A | * | 1/1986 | Hutchison et al. .......... 128/660 |
| 4,567,766 A | | 2/1986 | Seiferling |

(List continued on next page.)

OTHER PUBLICATIONS

U.S. Patent Application entitled "Ultrasonic Sensor System and Method Having Automatic Excitation Frequency Adjustment", by Frederic Marcel Sejalon, Stephen R.W. Cooper and Michelle Renee Schaffran, Attorney Docket No. TRW(TE)3625 (copy not enclosed).

*Primary Examiner*—Patrick Assouad
*Assistant Examiner*—Carol S Tsai
(74) *Attorney, Agent, or Firm*—Tarolli, Sundheim, Covell, Tummino & Szabo L.L.P.

(57) ABSTRACT

An ultrasonic sensor system (36) has a transducer (40) that emits an ultrasonic signal (54), in response to an electrical excitation signal (52) from driver/receiver circuitry (42), and outputs an electrical response signal (58), in response to receipt of a reflected ultrasonic signal (56) from an object, such as a vehicle occupant (14). The response signal (58) is an oscillating signal that has a voltage amplitude indicative of the strength of the reflected ultrasonic signal (56). A receiver circuit (68) of driver/receiver circuitry (42) processes the response signal (58) from said transducer (40) and outputs an analog, non-oscillating signal (60). The analog signal (60) has a voltage amplitude indicative of the voltage of the electrical response signal (58). A comparator (84) of a comparator preprocessor (44) compares the voltage of the analog signal (60) to a predetermined reference voltage ($V_{REF1}$) and outputs a digital signal (38). The digital signal (38) is indicative of whether the voltage of the analog signal (60) is greater or less than the reference voltage. A controller (28) processes the digital signal (38) for determining distance between the transducer (40) and the occupant (14). Preferably, the controller (28) controls a protection module (18).

25 Claims, 6 Drawing Sheets

U.S. PATENT DOCUMENTS

| | | | |
|---|---|---|---|
| 4,628,374 A | * 12/1986 | Camras | 360/66 |
| 4,670,711 A | * 6/1987 | Daniels | 324/77 |
| 4,687,962 A | 8/1987 | Elbert | |
| 4,785,664 A | 11/1988 | Reebs | |
| 4,793,178 A | 12/1988 | Ahern et al. | |
| 4,869,097 A | 9/1989 | Tittmann et al. | |
| 4,890,266 A | 12/1989 | Woodward | |
| 4,901,245 A | 2/1990 | Olson et al. | |
| 4,914,951 A | 4/1990 | Koelpin et al. | |
| 4,935,884 A | * 6/1990 | Hajicek | 364/562 |
| 5,126,946 A | * 6/1992 | Ko | 364/469 |
| 5,156,636 A | 10/1992 | Kuljis | |
| 5,157,639 A | 10/1992 | Leszczynski | |
| 5,207,101 A | 5/1993 | Haynes | |
| 5,212,467 A | 5/1993 | Park | |
| 5,277,065 A | 1/1994 | Leszczynski | |
| 5,287,291 A | * 2/1994 | Cuffe et al. | 364/507 |
| 5,300,922 A | * 4/1994 | Stoffer | 340/572 |
| 5,330,226 A | 7/1994 | Gentry et al. | |
| 5,351,527 A | 10/1994 | Blackburn et al. | |
| 5,353,010 A | * 10/1994 | Sanetra | 340/572 |
| 5,413,378 A | 5/1995 | Steffens, Jr. et al. | |
| 5,454,591 A | 10/1995 | Mazur et al. | |
| 5,491,648 A | * 2/1996 | Kuzuya et al. | 364/565 |
| 5,670,853 A | 9/1997 | Bauer | |
| 5,871,232 A | * 2/1999 | White | 280/735 |
| 5,935,182 A | * 8/1999 | Foo et al. | 701/45 |
| 5,963,882 A | * 10/1999 | Viertl et al. | 702/39 |
| 6,124,784 A | * 9/2000 | Wells | 340/438 |

\* cited by examiner

Fig. 3
(AMPLIFIED AND FILTERED
TRANSDUCER OUTPUT
SIGNAL 76 – AT A)

Fig. 4
(DETECTOR 78
OUTPUT – AT B)

Fig. 5
(DETECTOR 84
OUTPUT – AT C)

Fig. 9
(DETECTOR 98
OUTPUT – AT D)

ULTRASONIC SENSOR SYSTEM AND METHOD HAVING INPUT CAPTURE FOR ECHO PROCESSING

FIELD OF THE INVENTION

The present invention is directed to ultrasonic sensing and is particularly directed to a sensor system and method in which an analog output of an ultrasonic transducer is processed to provide data to a controller.

BACKGROUND OF THE INVENTION

Ultrasonic sensors are used to make remote distance measurements. One particular use of ultrasonic sensors is within a vehicle occupant protection system within a vehicle.

One type of protection system includes an actuatable occupant protection device. Examples of actuatable occupant protection devices include inflatable air bags and seat belt system pretensioners. The actuatable devices are actuated in response to one or more conditions for which it is predetermined that the occupant is to be protected. For example, the protection system includes a crash sensor that senses a vehicle collision. A controller of the protection system causes actuation of the protection device in response to a signal indicative of a vehicle collision from the crash sensor.

It is known in the art to adjust or tailor the actuation or deployment of a protection device. For example, the art has recognized that it is not always desirable to inflate an air bag with 100 percent of the available gas provided from a source of inflation fluid. It is known to adjust or tailor the protection deployment based upon one or more sensed occupant characteristics. An occupant protection device that has an adjustable aspect that is adjusted in response to a determination based upon a sensed occupant characteristic is commonly referred to as a "smart" device. It is known to use one or more ultrasonic sensors to sense one or more occupant characteristics (e.g., occupant position) for use in determining adjustment of a protection device.

Ultrasonic sensors typically have a piezoelectric ceramic transducer that converts an excitation electrical signal into ultrasonic energy bursts (i.e., a "ping"). The energy bursts travel from the ultrasonic sensor, bounce off objects, and are returned toward the sensor as echoes. The transducer converts received echoes into analog electrical signals that are output from the transducer.

In one known ultrasonic sensor system, an analog electrical signal, which is indicative of the received echo signal output from the transducer, is provided to an analog-to-digital ("A/D") input port of a controller of the system. The controller is programmed to initiate interrupts at regular intervals. During each interrupt, A/D readings are taken, and the digital information is stored in a random access memory ("RAM") within the controller. Specifically, the amplitude of the analog signal is digitally sampled. The controller processes the digital information stored within the RAM, via at least one algorithm, and makes determinations about the time of flight of the ultrasonic energy burst emitted from the transducer and reflected from an object (e.g., a vehicle occupant) back to the transducer. The time of flight is indicative of the distance between the transducer and the object.

In the known sensor system, the algorithm that the controller performs utilizes a relatively large amount of digital information regarding the transducer output. Thus, the amount of stored digital information is relatively large. Accordingly, a relatively large amount of RAM is necessary to store the information. Also, the digital processing required in the controller's interrupt, sampling, A/D conversation and storing requires a certain degree of "overhead" of the control process.

SUMMARY OF THE INVENTION

The present invention provides an ultrasonic sensor system. Transducer means emits an ultrasonic signal in response to an electrical excitation signal and outputs an electrical response signal in response to receipt of a reflected ultrasonic signal received from an object. The electrical response signal has an amplitude indicative of the strength of the reflected ultrasonic signal. Receiver means processes the electrical response signal from the transducer means and outputs an analog, non-oscillating signal. The analog signal has an amplitude indicative of the amplitude of the electrical response signal. Comparator means compares the amplitude of the analog signal to a predetermined amplitude value and outputs a digital signal having a first digital value when the amplitude of the analog signal is less than the predetermined amplitude value, and having a second digital value when the amplitude of the analog signal is greater than the predetermined amplitude value. Controller means processes the digital signal to determine distance between the transducer means and the object.

The present invention also provides the additional aspect of the controller means processing the analog signal output from the receiver means. The analog signal is processed to determine amplitude of the analog signal.

The present invention also provides a method of ultrasonic sensing. An ultrasonic signal is emitted in response to an electrical excitation signal. An oscillating electrical response signal is output in response to receipt of an ultrasonic signal reflected from an object. The electrical response signal has an amplitude indicative of the strength of the reflected ultrasonic signal. The electrical response signal is processed to provide an analog, non-oscillating signal. The analog signal has an amplitude indicative of the amplitude of the electrical response signal. The amplitude of the analog signal is compared to a predetermined amplitude value. A digital signal is provided that has a first digital value when the amplitude of the analog signal is less than the predetermined amplitude value and that has a second digital value when the amplitude of the analog signal is greater than the predetermined amplitude value. The digital signal is processed to determine distance between said transducer mean s and the object.

The present invention also provides the additional aspect of processing the analog signal output from the receiver means. Processing the analog signal results in a determination of amplitude of the analog signal.

DESCRIPTION OF DRAWINGS

The foregoing and other features and advantages of the present invention will becomes apparent to one skilled in the art to which the present invention relates upon consideration of the following description of the invention with reference to the accompanying drawings, wherein.

DESCRIPTION OF PREFERRED EMBODIMENTS

Figure 1:
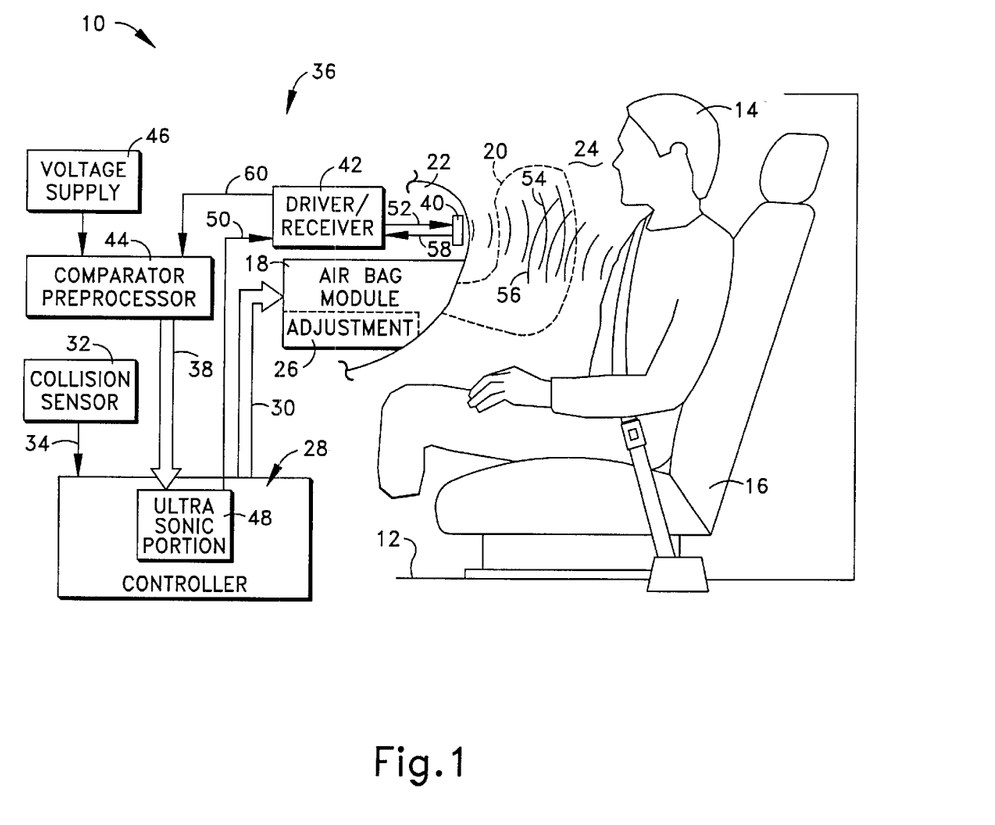
FIG. 1 is a schematic illustration of a vehicle occupant protection system having an ultrasonic sensor system in accordance with the present invention.

An occupant protection system 10 is schematically shown within a vehicle 12 in FIG. 1. The protection system 10 is provided for a vehicle occupant 14, who is a front-seat passenger and who is seated on a vehicle seat 16 within the vehicle 12. Within the protection system 10 is an actuatable occupant protection module 18, which includes an inflatable protection device 20. The inflatable protection device 20 is commonly referred to as an air bag.

Prior to inflation deployment, the air bag 20 is folded and stored within an instrument panel 22 of the vehicle, as is known in the art. A source of inflation fluid (not illustrated), such as an inert gas, is operatively connected to the air bag 20. Inflation fluid from the source, which may be generated by combustion of pyrotechnic material and/or released from a pressurized container, fills the air bag 20 to an inflated condition within an occupant compartment 24 of the vehicle 12. Once inflated, as occurs during a vehicle collision, the air bag 20 hopefully protects the occupant 14. Other occupant protection devices that can be used with the present invention include, for example, actuatable seat belts, inflatable knee bolsters, inflatable headliners, and inflatable side curtains.

The protection module 18 is of the type referred to in the art as a "smart" protection module, in that the protection module has at least one associated adjustable aspect 26. For example, one adjustable aspect 26 may be directed to deployment of the air bag 20. Examples of air bag deployment adjustment include deployment prevention, adjustment of inflation timing, adjustment of inflation pressure, and adjustment of location of the inflated air bag 20 relative to the occupant 14. A specific example of adjustment to inflation timing is control of the time of initiation of air bag inflation using a selected determination algorithm.

A specific example of adjustment of inflation pressure is control of an inflation fluid source to provide a controlled or pre-selected amount of inflation fluid to the air bag 20, e.g., a protection system having a plurality of separately controllable inflation fluid sources. Another specific example of adjustment of inflation pressure is control of a pressure release valve, which vents inflation fluid away from the air bag 20. A specific example of adjustment of air bag positioning is control of positioning motors operative to pivot the protection module 18 left, right, up, or down within the instrument panel 22. Another specific example of adjustment of air bag positioning is moving the entire protection module 18 toward or away from the occupant 14. Also, dynamic profile control can be accomplished by controllably directing inflation into the air bag 20 in predetermined zones within the air bag or by controlling the number and timing of operation of a plurality of inflation fluid sources and vent valves.

A controller 28 accomplishes control of the protection module 18, to adjust the adjustable aspect(s) 26 and to cause actuation of the protection module. The controller 28 provides control signals 30 to the protection module 18. In one example, the controller 28 is a microcomputer. The controller 28 receives sensory input from several sources and, using the sensory input, makes determinations regarding protection module control (e.g., the controller performs a crash algorithm).

One of the sensory input sources for the controller 28 is a sensor 32 that senses a vehicle condition for which the occupant 14 is to be protected. The sensor 32 provides a signal 34 to the controller 28 indicative of the sensed vehicle condition. In one example, which is illustrated in the figures, the sensor 32 is a collision/crash sensor and senses a condition that is indicative of a vehicle collision. Preferably, the collision sensor 32 is an accelerometer, and the signal 34 is an electrical signal having a characteristic (e.g., voltage, frequency) indicative of the sensed crash acceleration. It will be appreciated by a person of ordinary skill in the art that the protection system 10 could have a plurality of sensors 32 providing signals 34 to the controller 28 that are indicative of a variety of vehicle conditions for which the occupant 14 is to be protected.

The controller 28 analyzes the signal 34 from the sensor 32 and determines if a deployment crash condition is occurring. A deployment crash condition is one in which deployment of the air bag is desired to enhance the protecting function of the protection system for the occupant 14. It is contemplated that any of several known crash algorithms can be used for the determination of a deployment crash event. Examples of such algorithms are known in the art and they are not discussed herein for brevity.

Another sensory input source for the controller 28 is an ultrasonic sensor system 36, in accordance with the present invention, which provides at least one output signal 38 for use by the controller 28. The sensor system 36 includes an ultrasonic transducer 40, an associated driver/receiver circuitry 42, a comparator preprocessor 44, a voltage supply 46, and a control portion 48 of the controller 28 (hereinafter referred to as the "ultrasonic portion" of the controller).

The general operation of the ultrasonic sensor system 36 is as follows. The controller 28 provides an oscillating control signal 50 to the driver/receiver circuitry 42. In response to the control signal 50, the driver/receiver circuitry 42 provides an oscillating electrical excitation signal 52 to the ultrasonic transducer 40. The transducer 40 includes a piezoelectric element, which is excited in response to the electrical excitation to cause a mechanical movement.

The mechanical movement within the transducer 40 is a vibration (i.e., oscillation), such that the transducer emits an oscillating ultrasonic pulse signal 54 (i.e., a "ping"). During the electrical excitation of the transducer 40, the frequency of the mechanical vibration within the transducer is related to the frequency of the excitation signal 52. In other words, the excitation signal 52 drives the transducer's mechanical vibration. The amplitude of the mechanical vibration is dependent upon the amplitude of the excitation signal 52.

Vibration within the transducer 40 is also caused by an oscillating ultrasonic signal 56 impinging upon the transducer. The impinging ultrasonic signal 56 is a reflected pulse returning to the transducer 40. The reflected pulse is often referred to as an echo. In response to the impinging (i.e., echo or reflected) signal 56, the transducer 40 provides an oscillating electrical signal 58 to its driver/receiver circuitry 42. The amplitude of the electrical signal 58 is indicative of strength (i.e., amplitude) of the echo signal 56, which is, in turn, indicative of the distance between an object on the seat 16 and the transducer 40. Since the distance between the transducer 40 and the front of the air bag door are known, the echo signal is indicative of the distance between an object on the seat and the air bag door is known.

In response to the signal 58, the driver/receiver circuitry 42 outputs a signal 60 to the comparator preprocessor 44. The signal 60 is an analog, non-oscillating signal that has an amplitude indicative of the amplitude of the oscillating signal 58. The comparator preprocessor 44 makes at least one amplitude comparison between the signal 60 and a reference established by use of a voltage from the voltage supply 46. The outcome of the determination provides information regarding receipt of the echo signal 56 at the transducer 40 in a simple, easily processable form. Specifically, at least one of the signals 38 that is provided to the ultrasonic portion 48 of the controller 28 is a digital signal that toggles from one digital state to another digital state upon the receipt of the echo signal 56 impinging upon the transducer 40, and in this respect, is indicative of the receipt of the echo signal 56 impinging upon the transducer 40.

The ultrasonic control portion 48 of the controller 28 determines (e.g., measures) the time between providing the control signal 50 to the driver/receiver circuitry 42 (which causes the transmission of the signal 54) and appropriate toggle of the one digital signal 38 (which is indicative of the receipt of the echo signal 56 at the transducer 40). This time difference is often referred to as "time-of-flight." From this time difference, the controller 28 calculates a distance between the transducer 40 and the object that reflected the signal.

This is not to say that the ultrasonic portion 48 does not determined other information from the ultrasonic "ping", such as the amplitude or strength of the echo signal 56. However, at this point, it will be appreciated that the present invention provides an advantage of quickly and easily calculating the distance, compared to prior art devices. The corollary advantage of the present invention is that it is easy to perform the distance calculation often. Determinations of other information (e.g., amplitude) can be made at a rate independent of the distance calculation. For example, the other information determinations may be less frequent. Performing the other information determinations at less frequent intervals permits savings in the areas of processor time, memory, etc.

During operation of the illustrated embodiment, the transducer 40 directs its ultrasonic signal 54 from the instrument panel 22 toward the occupant position (i.e., the space within the occupant compartment 24 in front of the seat 16) in response to the electrical excitation. If the occupant 14 is seated on the seat 16, the ultrasonic signal 54 reflects off the occupant. The echo signal 56 is returned to the transducer 40, and the transducer provides the electrical signal 58 to the driver/receiver circuitry 42. The driver/receiver circuitry 42 outputs the signal 60 to the comparator preprocessor 44, in turn, the comparator preprocessor outputs the signal 38 to the controller 28. The controller 28 performs the various determinations, such as the time difference determination and, if desired, the amplitude determination. In turn, the distance between the transducer 40 and the occupant 14 is calculated.

The echo signal 56 that is reflected by the occupant 14, as opposed to a reflection from the seat 16, is indicative of the presence of the occupant. Specifically, if the echo signal 56 is reflected by the occupant 14, the determined time-of-flight, and the amplitude are different from the values that would be determined for the scenario of the occupant being absent. The controller 28 uses the information (e.g., occupant presence/absent, and the distance between the transducer and the occupant) to make one or more determinations regarding the deployment and/or adjustment of the protection module 18.

The protection module control determination(s) are based upon the fact that the distance between the transducer 40 and the occupant 14 is indicative of the distance between the protection module 18 and the occupant (i.e., the distance offset between the transducer and the protection module is known). Specifically, the distance information is used to determine if the occupant is located within an occupant-out-of-position ("OOP") zone. Deployment of the protection module 18 for an occupant that is located within an OOP zone will not enhance protection of the occupant; thus, deployment of the protection module is substantially attenuated or even suppressed. A person of ordinary skill in the art will appreciate that the transducer 40 may be located at other locations within the vehicle 12 for making appropriate distance measurements with regard to such other location.

Figure 2:
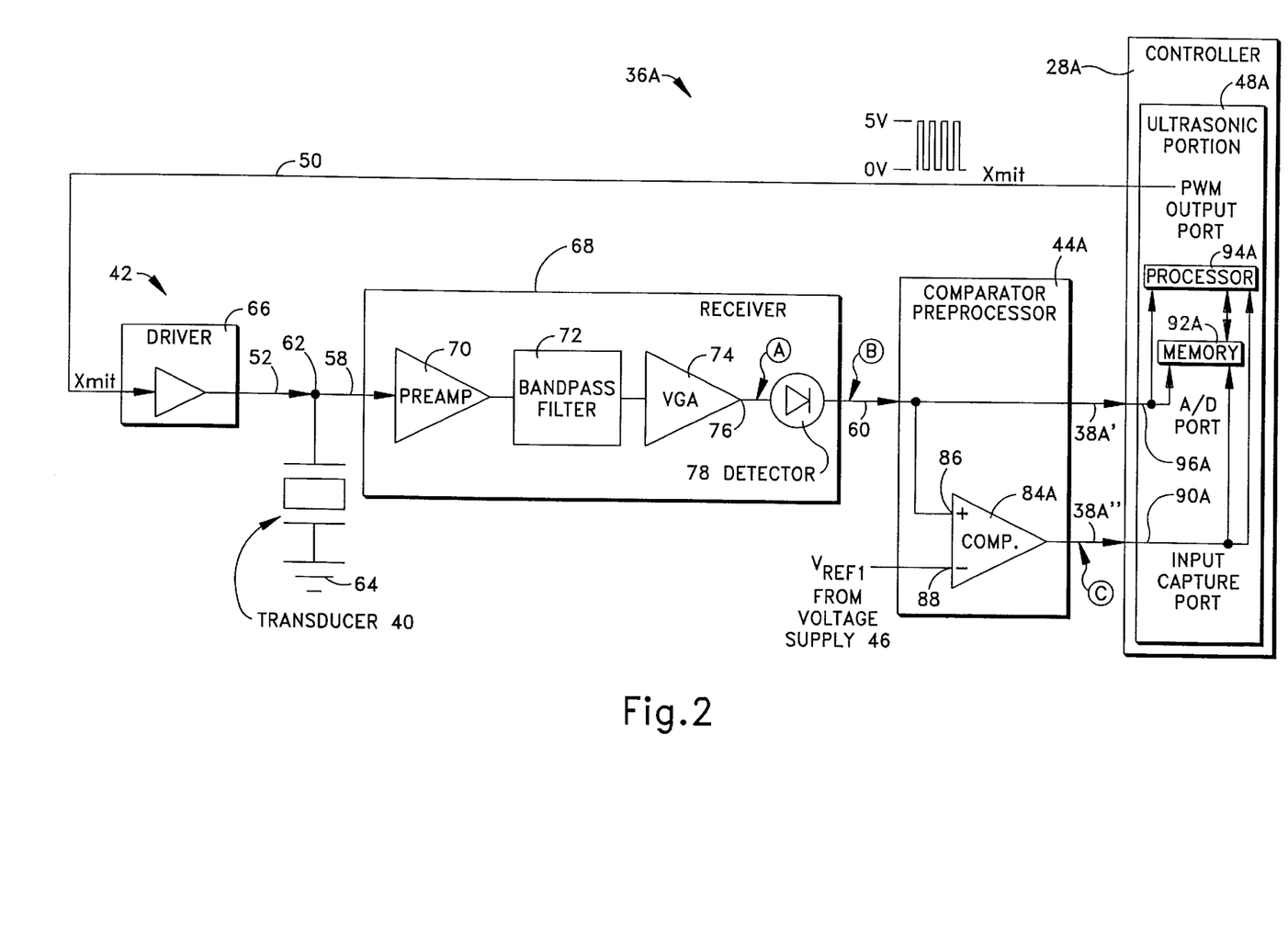
FIG. 2 is a schematic circuit diagram of a first embodiment of the present invention.

A first embodiment of the ultrasonic sensor system 36 is shown in FIG. 2 and is designated 36A. The transducer 40 is connected between a node 62 and electrical ground 64. A driver circuit 66 of the driver/receiver circuitry 42 is represented schematically as including an amplifier that is connected to receive the control signal 50 from the ultrasonic control portion 48 of the controller 28. The driver circuit 66 provides an amplified signal to the node 62.

Figure 3:
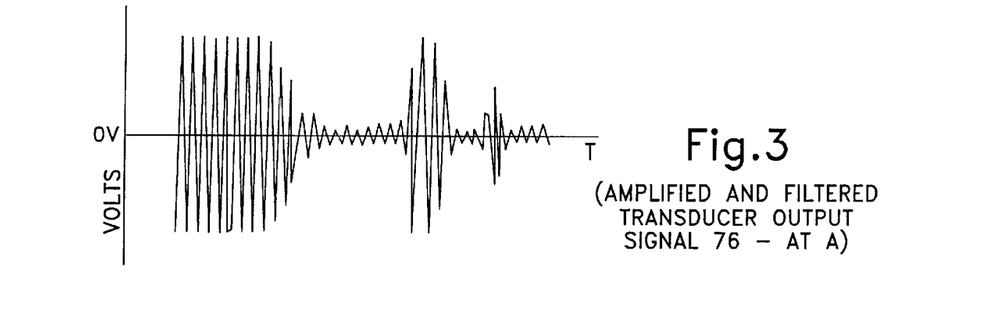
FIG. 3 is a signal plot taken at point A in FIG. 2.

A receiver circuit 68 of the driver/receiver circuitry 42 includes a preamplifier 70, a bandpass filter 72, and a variable gain amplifier (VGA) 74, which are serially arranged. The output 76 of the variable gain amplifier 74, location "A" in FIG. 2, is an oscillating electrical signal (FIG. 3) and is an amplified and filter version of the received echo signal 58. Thus, the amplitude of the signal 76 is indicative of the amplitude of the signal 58 (FIG. 2).

Because the driver circuit 66 and the receiver circuit 68 of the driver/receiver circuitry 42 are connected to the node 62, the receiver circuit "sees" not only electrical signals generated by vibration of the transducer 40, but also "sees" the excitation signal 52. Thus, the amplitude of the signal 76 is, for one time period, indicative of the excitation signal 52, for a second time period, indicative of the amplitude of vibration of the transducer 40 during a "ring-down" period, and, for a third time period, indicative of receipt of the echo signal 56.

The signal 76 is supplied as an input to a detector 78. The detector 78 outputs, at location "B" in FIG. 2, a non-oscillating voltage (e.g., D.C.) signal that has an amplitude related to the amplitude of the oscillating signal 76 from the variable gain amplifier 74. See FIG. 4. The signal output from the detector 78 (FIG. 2) is the signal 60 (i.e., the output signal of the driver/receiver circuit 42).

Figure 4:
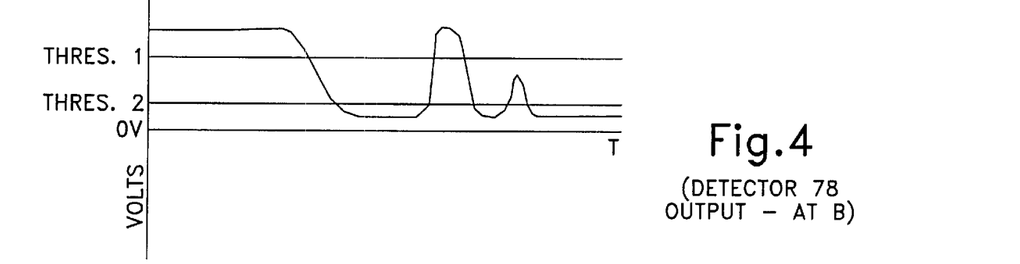
FIG. 4 is a signal plot taken at point B in FIG. 2.

Focusing now upon the comparator preprocessor 44 in accordance with the present invention, the embodiment of FIG. 2 shows a comparator preprocessor which is designated 44A. The comparator preprocessor 44A provides two signals 38 to the ultrasonic control portion (designated 48A) of the controller (designated 28A). These two output signals are identified as 38A' and 38A", respectively. The first signal 38A' is the unaltered signal 60 (the signal at "B", FIG. 4) and is provided to the ultrasonic control portion 48A (FIG. 2) of the controller 28A. Specifically, the signal 38A' is the analog signal as shown in FIG. 4.

The second signal 38A" is the output of a comparator 84A of the comparator preprocessor 44A, at location "C". A positive input terminal 86 of the comparator 84A is connected to the output of the driver/receiver circuitry 42 (i.e., the output of the detector 78 at location "B") to receive the signal 60. A negative input terminal 88 of the comparator 84A is connected to a reference voltage $V_{REF1}$ that is provided by the voltage supply 46. In one preferred embodiment, the $V_{REF1}$ is approximately 3 volts.

The signal 38A" is a digital signal (FIG. 5) that has a digital HIGH value (e.g., 5 volts) when the voltage amplitude of the signal 60 meets or exceeds the voltage amplitude $V_{REF1}$, and has a digital LOW value (e.g., at or near 0 volts) when the voltage amplitude of the signal 60 is less than the voltage amplitude $V_{REF1}$. Thus, the signal 38A" is indicative of the voltage of the signal 60 crossing the $V_{REF1}$ threshold. The digital HIGH is indicative of the transducer 40 vibrating above predetermined amplitude (e.g., either via the excitation signal or the echo signal 56). The digital pulse widths are indicative of the duration that the transducer 40 has vibration above the predetermined amplitude.

Figure 5:
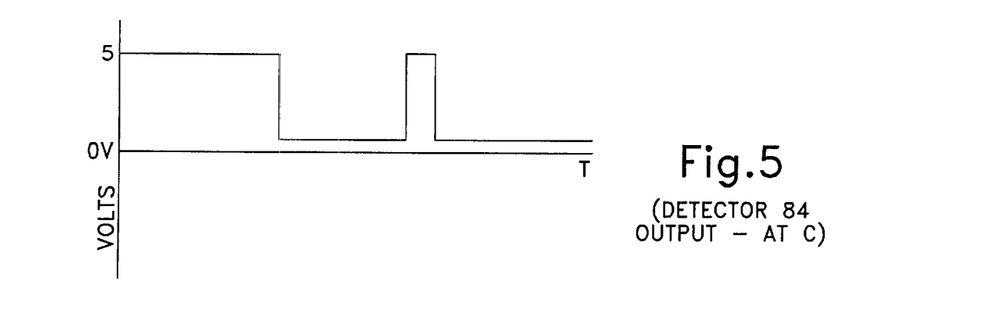
FIG. 5 is a signal plot taken at point C in FIG. 2.

The time between the leading edge of the digital pulse of the signal 38A" caused by the excitation signal 52 and the leading edge of the digital pulse caused by the echo signal 56 is indicative of the time of flight of the ultrasonic energy burst. As mentioned above, the time of flight is indicative of the distance between the transducer 40 and the object reflecting the ultrasonic energy burst (e.g., the occupant 14). The person of ordinary skill will appreciate that more that one digital echo pulse may be received due to a reflection from several objects (e.g., the occupant and the seat back).

The signal 38A" is provided to a digital port of the controller 28A, which is referred to as an input capture port 90A. Within the ultrasonic control portion 48A of the controller 28A, the information contained with the digital signal 38A" is stored to a memory 92A. A processor 94A retrieves the information and uses the information to determine the presence of the occupant 14, the distance between the transducer 40 and the occupant, etc. The processing of the information provided via the signal 38A" is not a relatively complex procedure. Thus, the processor time required to make the distance determination is not very long. Because the distance determination is made utilizing the information from the signal 38A", the processor 94A does not need to perform a complex algorithm to process the analog signal 38A', and make determinations regarding presence of the occupant 14 and the distance between the transducer 40 and the occupant, on a regular schedule.

Figure 6:
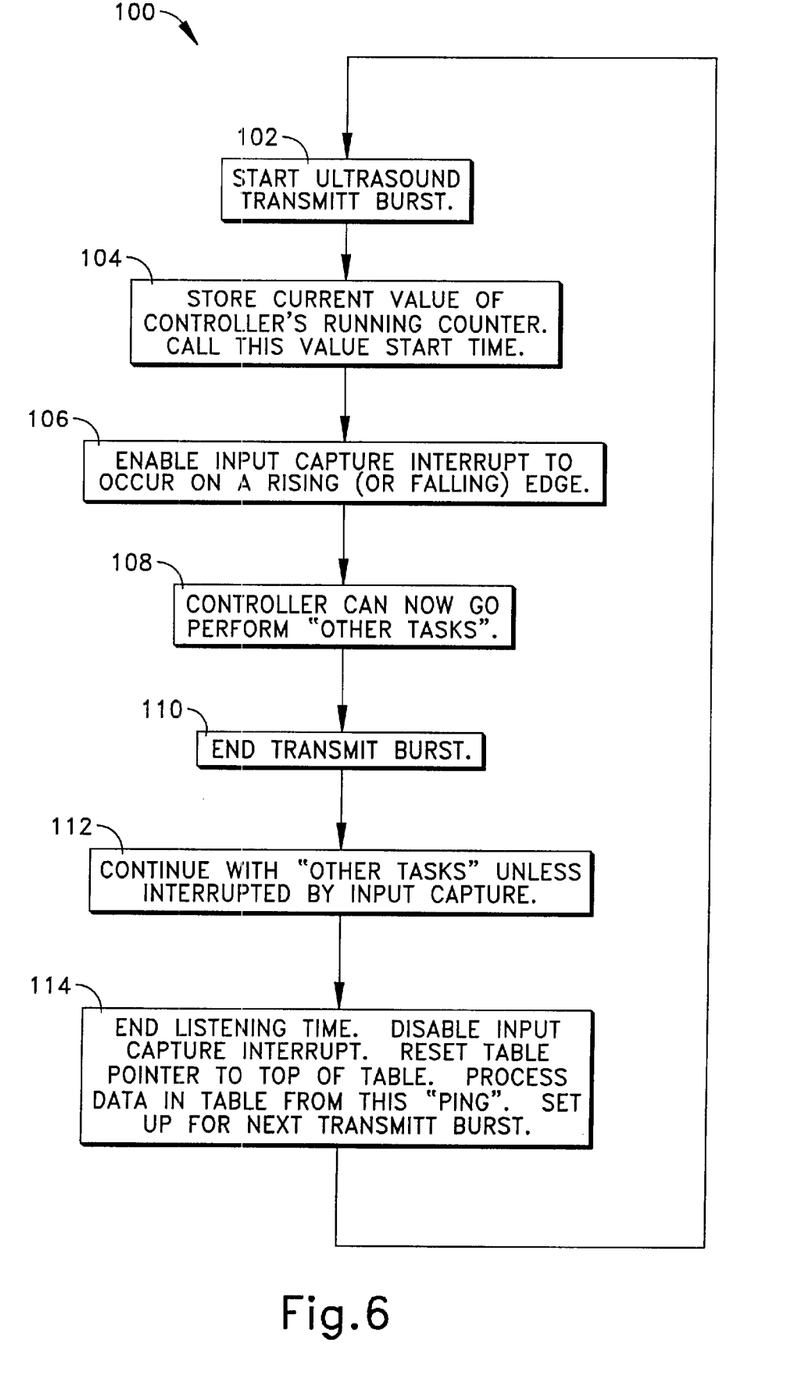
FIG. 6 is a flow chart for a process in accordance with the present invention and performed by the embodiment of the ultrasonic sensor system of FIG. 2.

An example process 100 performed within the sensor system 36A in accordance with the present invention is shown in FIG. 6. The illustrated process 100 deals with the distance determination of the present invention, via the comparator 84A and the input capture port 90. It should be appreciated that the process 100 is part of an overall process that is performed within the sensor system 36A.

The process 100 begins at step 102, in which the ultrasonic control portion 48A of the controller 28A begins providing the control signal 50 to the driver circuit 66. At step 104, the current value of a free running counter within the controller 28A is stored. The value is referred to as "start time." At step 106, the input capture port 90A is enabled.

At step 108, the processor performs other tasks. In other words, the processing time of the processor 94A is shared among various portions of the controller 28A. Examples of other tasks that are performed by the processor 94A include performance of restraint actuator control algorithms. At step 110, the signal 58 is terminated, and accordingly, the excitation signal 52 ceases.

At step 112, the processor 94A continues with other tasks, unless the processor is interrupted by an input capture at the input capture port 90A. In other words, the ultrasonic portion 48A "listens" for the "return" while doing other tasks. An interrupt occurs upon the receipt of a rising edge (beginning edge of a pulse) in the signal 38A". Alternatively, a falling edge of the digital pulse could be used for the interrupt. Upon the occurrence of the interrupt, the ultrasonic portion 48A performs a routine shown in FIG. 7, discussed below.

The process 100 (FIG. 6) goes to step 114 at the end of the "listening time". The input capture port 90A is disabled and a table pointer is reset. The processor 94A processes the data stored within the memory 92A for this transmission burst/return echo (i.e., "ping"). Upon completion of the processing of the data, flags, etc. are reset for the next transmission burst. The process 100 goes to step 102, and the process is repeated.

Focussing now on the routine 120 (FIG. 7), when the echo causes the interrupt (i.e., the digital pulse at the input capture port 90A), routine 120 is performed. Specifically, the routine 120 begins at step 122 (the interrupt is triggered by the rising (or falling) edge of the pulse of the signal 38A". At step 124, the logic HIGH level is read and stored at an address within the memory 92A pointed by the pointer table. At step 126, the start time is subtracted from the value in the input capture register, and the result is stored at the address of table pointer plus 1. At step 128, the table pointer is incremented to the next line of the table.

Figure 7:
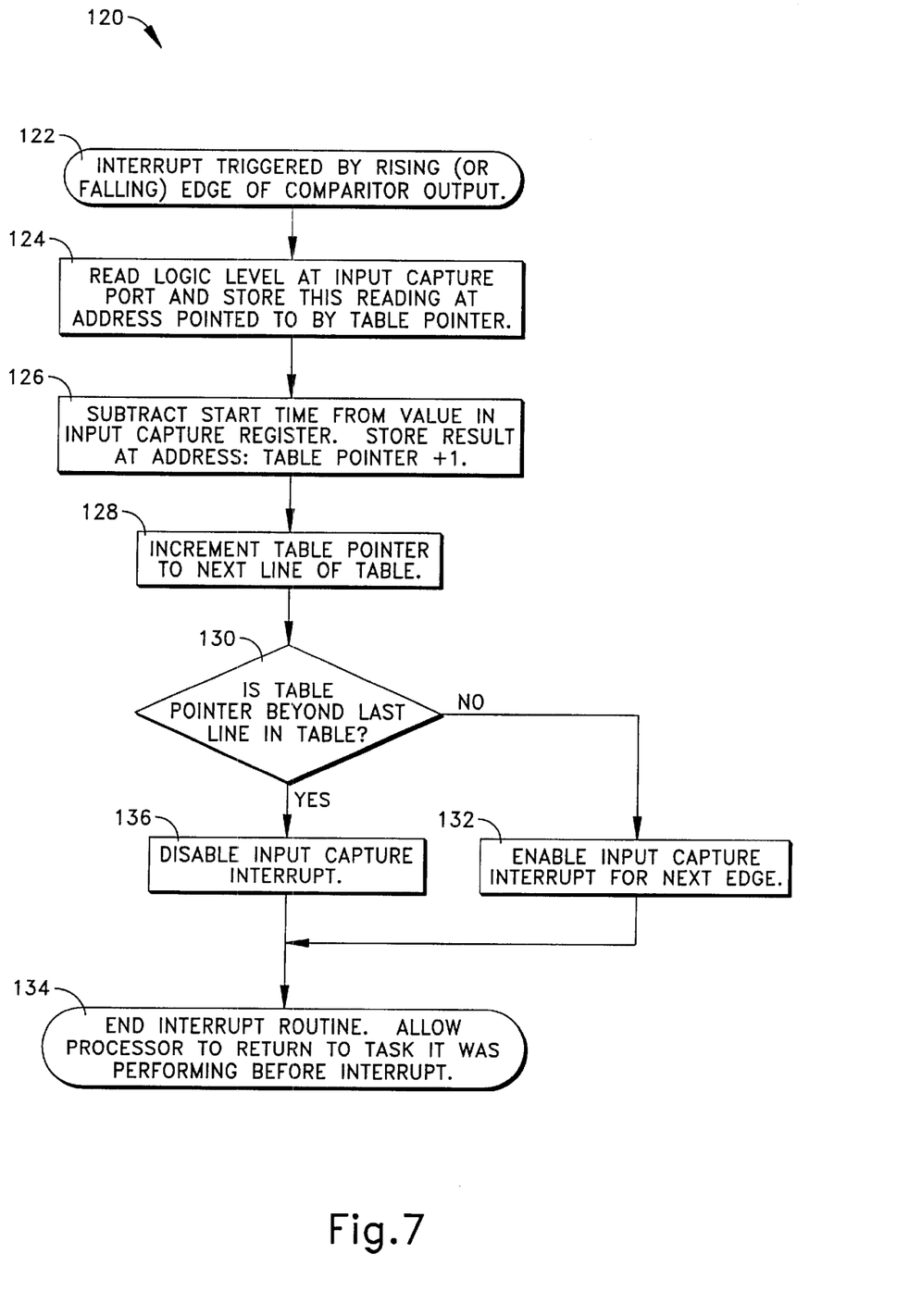
FIG. 7 is a flow chart for a process in accordance with the present invention and performed within a controller shown in FIG. 2.

At step 130, it is determined whether the table pointer is beyond the last line in the table. If the determination at step 130 is negative (i.e., the end of the table is not yet exceeded), the routine 120 goes to step 132. At step 132, the input capture port 90A is enabled for the next interrupt. Upon completion of step 132, the routine 120 goes to step 134 in which the interrupt routine 120 ends. The processor 94A returns to the task it was performing (i.e., within step 112 of process 100) before the interrupt.

If the determination at step 130 is affirmative (i.e., the table pointer is beyond the last line in the table), the routine 120 goes to step 136, in which the input capture port 90A is disabled. Upon completion of step 136, the routine 120 goes to step 134.

Turning again to the structure of the illustrated embodiment, the analog signal 38A' is provided to an A/D converter input port 96A for conversion to digital information. The sampled digitized information from the analog signal 38A' is used to determine the amplitude of the analog signal 38A' at discrete time points, as the amplitude varies over time (e.g., calculation of the amplitude of the echo signal 56 at time intervals). The information regarding the amplitude versus time variation is useful to identify the "profile" or "shape" of the analog signal 38A', which is, of course, representative of the echo signal.

Any suitable algorithm is used to take sample values and to calculate the signal amplitude (hereinafter referred to as the A/D sampling/processing). Several algorithms are known and are not discussed herein for brevity. Preferably, the amplitude calculation is performed at timed intervals. Preferably, the A/D sampling/processing is done at a reduced rate compared to prior art devices. In one example, the A/D sampling/processing is done in a periodic manner, but at a fraction (e.g., one-half or one-fourth) of the rate of prior art devices. Without the use of input capture in accordance with the present invention, such a reduction in the A/D sampling/processing would result in a reduction in resolution and an increase in the imprecision of the time-of-flight measurement.

In another example, the A/D sampling/processing is done only during a time period in which the return echo signal 56 is expected. In another example, the A/D sampling/processing is done only when the signal 38A" output from the comparator 84A is HIGH (i.e., indicating a return echo signal 56 is being received). In yet another example, the A/D sampling/processing is done only for a predetermined time period after the signal 38" output from the comparator 84 is HIGH. Such limits on when the A/D sampling/processing occurs can result in significant data compression while still gathering information concerning the amplitude versus time variation.

In addition, information conveyed via the analog signal 38A' can itself be used to calculate distance (i.e., time-of-flight). The distance calculation based upon the information from the analog signal 38A' requires a more complex algorithm compared to the algorithm that is used for the comparator output signal 38A". However, the analog-based distance calculation can be used as a redundant check or a diagnostic test. These tests can, if desired, be performed on an infrequent schedule. Performing algorithms on a less frequency basis lowers demands on processor time, etc., and lowers the amounts of required memory, etc.

Thus, comparing the present invention to prior art devices, the present invention provides a device that provides distance determinations and yet uses less processor time. In some prior art devices, the controller must initiate frequent interrupts to read and store A/D data when A/D data, alone, is used to determine distance (i.e., time-of-flight), such that sufficient resolution is provided to ensure that a short-duration echo is not missed. The present invention provides a device that requires less interrupts to make a distance determination compared to the A/D approach of the prior art. Fewer interrupts are required in a device according to the present invention because data is only read and stored when a threshold voltage is crossed.

Further, even if A/D sampling is used to make amplitude determinations (as in the first embodiment disclosed herein), the result is less required processor time compared to the A/D only approach of the prior art. The lower processor time requirement is the result of the amplitude determination from an A/D sampling occurring at a less frequent rate (i.e., less often than the distance is determined). One benefit that stems from the present invention is that a slower/less expensive processor circuit can be used. Also, a small memory is required because less information is being stored. Thus, as a benefit arising from the present invention, a reduction in calculation overhead is achieved, while still permitting determination of the amplitude versus time variation.

Figure 8:
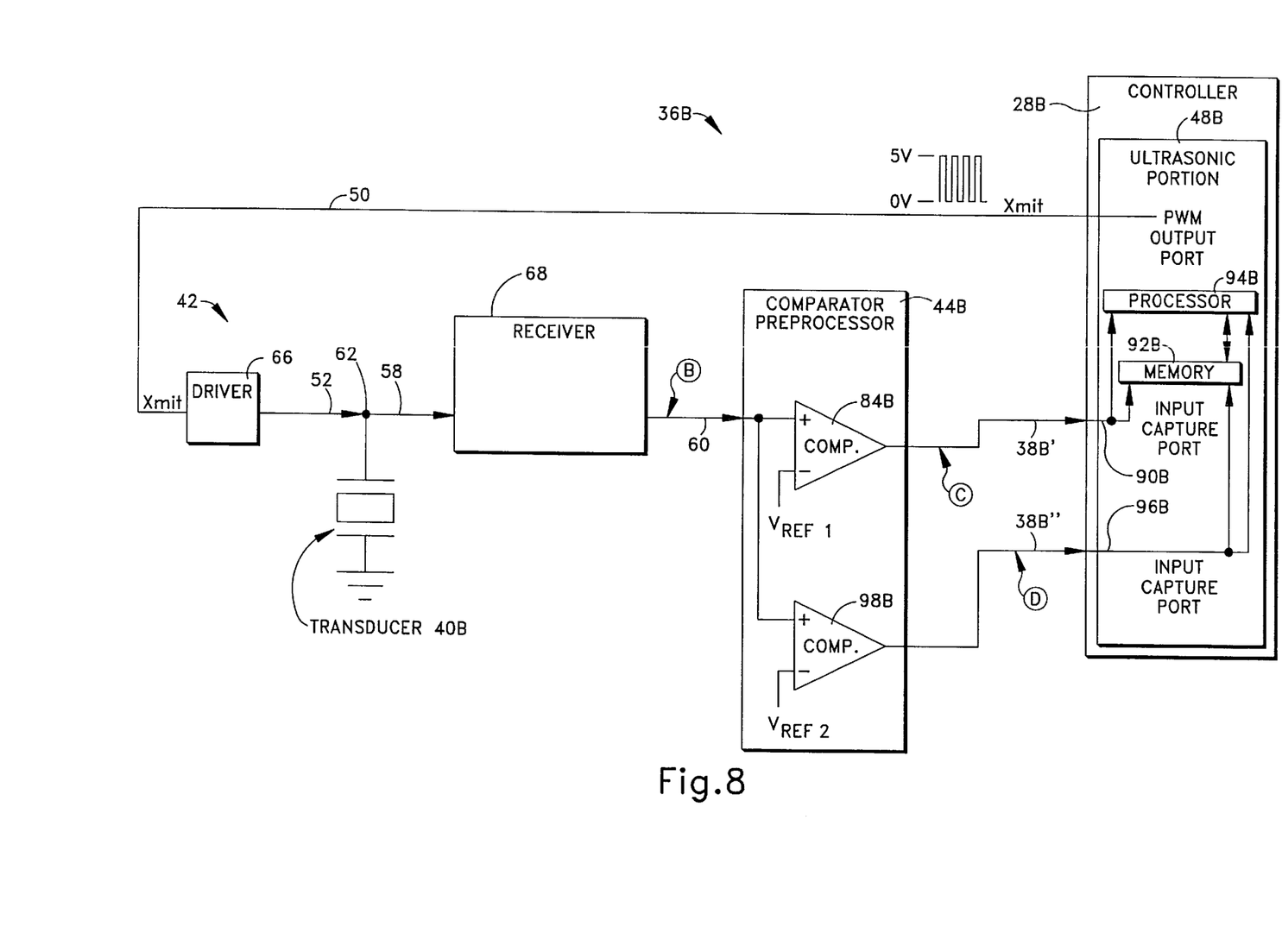
FIG. 8 is a schematic circuit diagram of a second embodiment in accordance with the present invention.

It is even contemplated that, if the occupant sensing algorithm does not require high resolution amplitude data, the need for A/D input may be eliminated entirely by using comparators to obtain high resolution time data and low resolution amplitude data. The cost of several comparators is significantly less than many A/D converters. With these features in mind, a second embodiment of the ultrasonic sensor system (designated 36B), in accordance with the present invention, is shown in FIG. 8. The ultrasonic sensor system 36B includes a transducer 40, a driver circuit 66, and a receiver circuit 68 that are identical to the transducer, driver circuit, and receiver portion, respectively, of the ultrasonic sensor system 36A shown in FIG. 2. The embodiment shown in FIG. 8 differs from the embodiment of FIG. 2 in that the comparator preprocessor 44B differs from the comparator preprocessor 44A, and the ultrasonic portion 48B of the controller 28B differs from the ultrasonic portion 48A of the controller 28A.

The comparator preprocessor 44B has a first comparator 84B that is identical to the comparator 84A of the first embodiment. Specifically, the positive input of the comparator 84B is connected to the output of the driver/receiver circuitry 42 to receive the signal 60 (location "B"). The negative input terminal of the comparator 84B is connected to the reference voltage $V_{REF1}$ that is provided by the voltage supply. Preferably, the $V_{REF1}$ is approximately 3 volts. The signal 38B' is a digital signal that has a digital HIGH value (e.g., 5 volts) when the voltage amplitude of the signal 60 meets or exceeds the voltage amplitude $V_{REF1}$, and has a digital LOW value (e.g., at or near 0 volts) when the voltage amplitude of the signal 60 is less than the voltage amplitude $V_{REF1}$. Thus, the signal 38B' is identical to the signal 38A". Location "C" is also used in FIG. 8 (see FIG. 5 for appearance of signal at "C").

Figure 9:
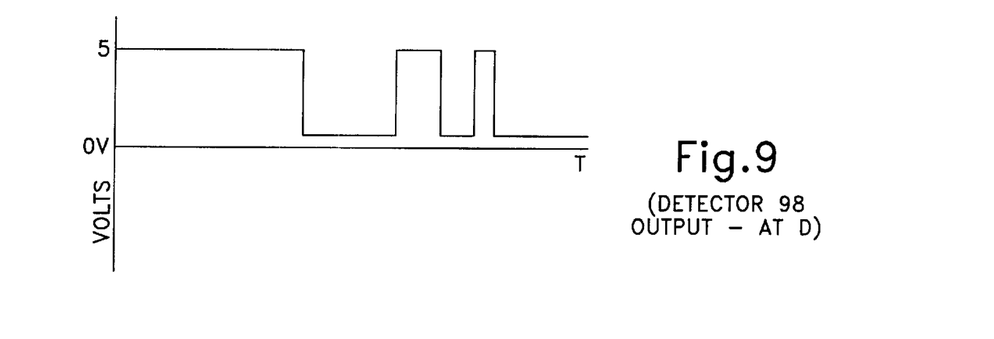
FIG. 9 is a signal plot taken at point D in FIG. 8.

The comparator preprocessor 44B differs from the comparator preprocessor 44A because the comparator preprocessor 44B does not provide the unaltered signal 60 to the controller 28B, but instead has a second comparator 98B. The positive input of the second comparator 98B is connected to the output of the driver/receiver circuitry 42 to receive the signal 60 (location "B"). The negative input terminal of the comparator 98B is connected to a reference voltage $V_{REF2}$ that is provided by the voltage supply. Preferably, the $V_{REF2}$ is approximately 1 volt. The signal 38B" at location "D" in FIG. 8 is a digital signal (FIG. 9) that has a digital HIGH value (e.g., 5 volts) when the voltage amplitude of the signal 60 meets or exceeds the voltage amplitude $V_{REF2}$, and has a digital LOW value (e.g., at or near 0 volts) when the voltage amplitude of the signal 60 is less than the voltage amplitude $V_{REF2}$.

The ultrasonic portion 48B of the controller 28B differs from the ultrasonic portion 48A of the controller 28A in that the ultrasonic portion 48B of the controller 28B does not have an A/D input port. The memory 92B of the ultrasonic portion 48B of the controller 28B need not have a memory capacity for handling the digitized version of the analog signal provided by the A/D input port 96A. The processor 94B of the ultrasonic portion 48B of the controller 28B need not have a processing capacity for handling the digitized version of the analog signal provided by the A/D input port 96A. Instead, the ultrasonic portion 48B of the controller 28B has a second input capture port 96B.

During operation of the second embodiment, the information provided via the first input capture port 90B is used in the same way as the information provided via the input capture port 90A of the first embodiment. The second embodiment differs from the first embodiment, in that the information provided via the two input capture ports is used to create a rudimentary representation of the signal 60. The rudimentary representation is used to make amplitude determinations, instead of the A/D approach of the first embodiment. Similar to the first embodiment, the amplitude determinations may be performed on an infrequent schedule.

From the above description of the invention, those skilled in the art will perceive improvements, changes and modifications. For example, the invention may be used for other, non-vehicle, applications. Further, the first embodiment may be modified such that signal 38A', the A/D port, and processing of the information gathered at the A/D port by the ultrasonic portion 48A of the controller 28A are eliminated to permit a simplified determination regarding distance between the transducer and the occupant based upon only the signal 38A". Also, the second embodiment could be modified such that the comparator preprocessor has more than two comparators and the ultrasonic portion of the controller has a corresponding number of input capture ports. Each of the comparators utilizes a different threshold value. The controller would be able to create a more sophisticated representation of the signal 60, without the need of a conventional A/D converter or the associated processing time. Such improvements, changes and modifications within the skill of the art are intended to be covered by the appended claims.

Having described the invention, the following is claim:

1. An ultrasonic sensor system comprising:
   transducer means for emitting an ultrasonic signal in response to an electrical excitation signal and for outputting an oscillating electrical response signal in response to receipt of a reflected ultrasonic signal from an object, the electrical response signal having an amplitude indicative of the strength of the reflected ultrasonic signal;
   receiver means for processing the electrical response signal from said transducer means and for outputting an analog, non-oscillating signal, the analog signal having an amplitude indicative of the amplitude of the electrical response signal;
   comparator means for comparing the amplitude of the analog signal to a predetermined amplitude value and for outputting a digital signal having a first digital value when the amplitude of the analog signal is less than the predetermined amplitude value and having a second digital value when the amplitude of the analog signal is greater than the predetermined amplitude value; and
   controller means for processing the digital signal to determine distance between said transducer means and the object.

2. A system as set forth in claim 1, wherein the analog signal output by said receiver means has a voltage value that is indicative of the amplitude of the electrical response signal, said comparator means includes a comparator circuit having a first input for receiving the analog signal and a second input for receiving a voltage signal having a reference voltage value that is the predetermined amplitude value, said comparator circuit outputs a signal that has a first voltage value that represents the first digital value when the voltage of the analog signal is less than the reference voltage value and has a second voltage value that represents the second digital value when the voltage of the analog signal is greater than the reference voltage value.

3. A system as set forth in claim 2, wherein said comparator circuit includes means for outputting the signal with a comparatively low voltage for the first voltage value and with a comparatively high voltage for the second voltage value.

4. A system as set forth in claim 1, wherein said receiver means includes means for amplifying and filtering the response signal to process the response signal and for outputting an amplified and filtered oscillating signal.

5. A system as set forth in claim 4, wherein said receiver means includes detector means for detecting an amplitude of the amplified and filtered oscillating signal, and for outputting the analog, non-oscillating signal.

6. A system as set forth in claim 1 including means for processing the analog signal to determine amplitude of the analog signal.

7. A system as set forth in claim 6, wherein said means for processing the analog signal includes an analog-to-digital converter.

8. A system as set forth in claim 1, wherein said controller means includes means for providing a signal to a vehicle occupant protection system having a controllable protection device that is controlled in response to the determination.

9. An ultrasonic sensor system comprising:
   transducer means for emitting an ultrasonic signal in response to an electrical excitation signal and for outputting an oscillating electrical response signal in response to receipt of a reflected ultrasonic signal from an object, the electrical response signal having an amplitude indicative of the strength of the reflected ultrasonic signal;
   receiver means for processing the electrical response signal from said transducer means and for outputting an analog, non-oscillating signal, the analog signal having an amplitude indicative of the amplitude of the electrical response signal;
   comparator means for comparing the amplitude of the analog signal to a predetermined amplitude value and for outputting a digital signal having a first digital value when the amplitude of the analog signal is less than the predetermined amplitude value and having a second digital value when the amplitude of the analog signal is greater than the predetermined amplitude value;
   controller means for processing the digital signal to determine distance between said transducer means and the object, and for processing the analog signal to determine amplitude of the analog signal.

10. A system as set forth in claim 9, wherein said controller means includes means for processing the analog signal to determine amplitude of the analog signal only while said digital signal has the second digital value.

11. A system as set forth in claim 9, wherein said controller means includes means for processing the analog signal to determine amplitude of the analog signal only during a predetermined duration after the digital signal changes from the first digital value to the second digital value.

12. A method of ultrasonic sensing comprising:
    emitting an ultrasonic signal in response to an electrical excitation signal;
    outputting an oscillating electrical response signal in response to receipt of a reflected ultrasonic signal from an object, the electrical response signal having an amplitude indicative of the strength of the reflected ultrasonic signal;
    processing the electrical response signal to provide an analog, non-oscillating signal, the analog signal having an amplitude indicative of the amplitude of the electrical response signal;
    comparing the amplitude of the analog signal to a predetermined amplitude value;
    providing a digital signal having a first digital value when the amplitude of the analog signal is less than the predetermined amplitude value and having a second digital value when the amplitude of the analog signal is greater than the predetermined amplitude value; and
    processing the digital signal for determining distance between said transducer means and the object.

13. A method as set forth in claim 12, wherein the analog, non-oscillating signal has a voltage value that is indicative of the amplitude of the electrical response signal, said step of comparing includes receiving the analog signal as a first input and receiving a voltage signal having a reference voltage value that is the predetermined amplitude value as a second input, said step of comparing also includes outputting a signal that has a first voltage value that represents the first digital value when the voltage of the analog signal is less than the reference voltage value and has a second voltage value that represents the second digital value when the voltage of the analog signal is greater than the reference voltage value.

14. A method as set forth in claim 13, wherein said step of comparing includes outputting the signal with a comparatively low voltage for the first voltage value and with a comparatively high voltage for the second voltage value.

15. A method as set forth in claim 12, wherein said step of receiving includes amplifying and filtering the response signal to process the response signal, and outputting an amplified and filtered oscillating signal.

16. A method as set forth in claim 15, wherein said step of receiving includes detecting an amplitude of the amplified and filtered oscillating signal, and outputting the analog, non-oscillating signal indicative of the detected amplitude.

17. A method as set forth in claim 12 including processing the analog signal to determine amplitude of the analog signal.

18. A method as set forth in claim 17, wherein said step of processing the analog signal to determine amplitude includes inputting the analog signal to an analog-to-digital converter.

19. A method as set forth in claim 12, wherein said step of comparing includes comparing the amplitude of the analog signal to a first predetermined amplitude value, said step of providing a digital signal includes providing the digital signal as a first digital signal that has a first digital value when the amplitude of the analog signal is less than first predetermined amplitude value and that has a second digital value when the amplitude of the analog signal is greater than the first predetermined amplitude value, said method includes a plurality of steps of comparing the amplitude of the analog signal to a plurality of predetermined amplitude values, said method includes providing a plurality of digital signals, each digital signal has a first digital value when the amplitude of the analog signal is less than a respective one of the predetermined amplitude values and has a second digital value when the amplitude of the analog signal is greater than the respective one of the predetermined amplitude values, and said method further includes processing the plurality of digital signals for determining amplitude of the analog signal.

20. A method as set forth in claim 12 including providing a signal to a vehicle occupant protection system having a controllable protection device that is controlled in response to the determination.

21. A method of ultrasonic sensing comprising:
emitting an ultrasonic signal in response to an electrical excitation signal;
outputting an oscillating electrical response signal in response to receipt of a reflected ultrasonic signal from an object, the electrical response signal having an amplitude indicative of the strength of the reflected ultrasonic signal;
processing the electrical response signal to provide an analog, non-oscillating signal, the analog signal having an amplitude indicative of the amplitude of the electrical response signal;
comparing the amplitude of the analog signal to a predetermined amplitude value;
providing a digital signal having a first digital value when the amplitude of the analog signal is less than the predetermined amplitude value and having a second digital value when the amplitude of the analog signal is greater than the predetermined amplitude value;
processing the digital signal for determining distance between said transducer means and the object; and
processing the analog signal to determine amplitude of the analog signal.

22. A method as set forth in claim 21, wherein said step of processing the analog signal only occurs when the digital signal has the second value.

23. A method as set forth in claim 21, wherein said step of processing the analog signal only occurs for a predetermined duration after the digital signal changes from the first digital value to the second digital value.

24. An ultrasonic sensor system comprising:
transducer means for emitting an ultrasonic signal in response to an electrical excitation signal and for outputting an oscillating electrical response signal in response to receipt of a reflected ultrasonic signal from an object, the electrical response signal having an amplitude indicative of the strength of the reflected ultrasonic signal;
receiver means for processing the electrical response signal from said transducer means and for outputting an analog, non-oscillating signal, the analog signal having an amplitude indicative of the amplitude of the electrical response signal;
comparator means, including a first comparator means for comparing the amplitude of the analog signal to a first predetermined amplitude value and for outputting a first digital signal having a first digital value when the amplitude of the analog signal is less than the first predetermined amplitude value and having a second digital value when the amplitude of the analog signal is greater than the first predetermined amplitude value;
a second comparator means for comparing the amplitude of the analog signal to a second predetermined amplitude value and for outputting a second digital signal having a first digital value when the amplitude of the analog signal is less than the second predetermined amplitude value and having a second digital value when the amplitude of the analog signal is greater than the second predetermined amplitude value; and
controller means for processing the first digital signal to determine distance between said transducer means and the object and for processing the first and second digital signals to determine amplitude of the analog signal.

25. A system as set forth in claim 24, wherein said system includes a plurality of comparator means, said first comparator means is one of said plurality of comparator means, each of said plurality of comparator means compares the amplitude of the analog signal to a respective predetermined amplitude value and outputs a respective digital signal, each digital signal has a first digital value when the amplitude of the analog signal is less than the respective predetermined amplitude value and has a second digital value when the amplitude of the analog signal is greater than the respective predetermined amplitude value, said controller means also for processing the plurality of digital signals to determine amplitude of the analog signal.

* * * * *